(12) United States Patent
Tovey et al.

(10) Patent No.: US 10,629,018 B2
(45) Date of Patent: Apr. 21, 2020

(54) SECURITY SYSTEM FOR AN AUTOMATED LOCKER THAT STORES AND DISPENSES CUSTOMER ORDERS

(71) Applicant: Walmart Apollo, LLC, Bentonville, AR (US)

(72) Inventors: David G. Tovey, Rogers, AR (US); Robert Armstrong, Bentonville, AR (US); Todd Mattingly, Bentonville, AR (US); Kurt W. R. Bessel, Mexico, NY (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/388,027

(22) Filed: Apr. 18, 2019

(65) Prior Publication Data
US 2019/0325683 A1    Oct. 24, 2019

Related U.S. Application Data

(60) Provisional application No. 62/659,973, filed on Apr. 19, 2018.

(51) Int. Cl.
*G07C 9/00* (2020.01)
*A47G 29/14* (2006.01)
(Continued)

(52) U.S. Cl.
CPC ....... *G07C 9/00912* (2013.01); *A47G 29/141* (2013.01); *A47G 29/30* (2013.01);
(Continued)

(58) Field of Classification Search
None
See application file for complete search history.

(56) References Cited

U.S. PATENT DOCUMENTS 9,052,992 B2   6/2015   Irwin et al.
9,242,810 B2   1/2016   Lösov et al.
(Continued)

FOREIGN PATENT DOCUMENTS

CN    203025817 U    6/2013
EP    2835078 A1    2/2015
(Continued)

OTHER PUBLICATIONS

Cleveron AS, "Cleveron Introduction 2016", https://www.youtube.com/watch?v=ly4K_yWCXRg, 2016, pp. 1.
(Continued)

*Primary Examiner* — Carlos Garcia
(74) *Attorney, Agent, or Firm* — Venable LLP; Jeffri A. Kaminski

(57) ABSTRACT

An example security system for an automated locker that stores and dispenses customer orders, include the automated locker including a plurality of sensors and a central computer in communication with the plurality sensors. The plurality sensors can include: at least one smoke detector, at least one camera, at least one sniffer, at least one shock sensor, at least one flood sensor, at least one wind sensor, and at least one fire sensor. The security system may also include a remote server configured to receive sensitive data that is encrypted and/or erased from the central computer upon detecting a hack on the central computer.

19 Claims, 4 Drawing Sheets

(51) Int. Cl.
*A47G 29/30* (2006.01)
*G06Q 10/08* (2012.01)
*G08B 19/00* (2006.01)

(52) U.S. Cl.
CPC ......... *G06Q 10/0832* (2013.01); *G08B 19/00* (2013.01); *A47G 2029/147* (2013.01); *A47G 2029/149* (2013.01)

(56) References Cited

U.S. PATENT DOCUMENTS

| | | |
|---|---|---|
| 9,665,690 B2 | 5/2017 | Adams et al. |
| 10,255,791 B2* | 4/2019 | Wilkinson ............ H04W 4/029 |
| 2005/0046584 A1 | 3/2005 | Breed |
| 2006/0020489 A1 | 1/2006 | Rivalto |
| 2015/0186840 A1 | 7/2015 | Torres et al. |
| 2015/0220900 A1 | 8/2015 | Neilan et al. |
| 2017/0073159 A1 | 3/2017 | Lossov et al. |

FOREIGN PATENT DOCUMENTS

| | | |
|---|---|---|
| GB | 2430608 A | 4/2007 |
| WO | 20140182259 A1 | 11/2014 |
| WO | 2017029611 A1 | 2/2017 |

OTHER PUBLICATIONS

International Search Report and Written Opinion dated Jul. 18, 2019, in corresponding International Application No. PCT/US2019/028079 (16 pages).

\* cited by examiner

SECURITY SYSTEM FOR AN AUTOMATED LOCKER THAT STORES AND DISPENSES CUSTOMER ORDERS

This patent application claims the benefit of U.S. Provisional Application No. 62/659,973, filed on Apr. 19, 2018, content of which is incorporated by reference herein.

BACKGROUND

1. Technical Field

The present disclosure relates to an automated locker that stores and dispenses customer orders. More specifically, the present disclosure relates to a security system for an automated locker that stores and dispenses customer orders.

2. Introduction

An automated locker or kiosk that receives, stores, and/or dispenses customer orders, may be deployed at a desired location, by a retailer/business. As used herein, the "locker" and "kiosk" are interchangeable. Customers' orders may be loaded into the locker by store associates, carriers, and/or received into the locker via deliveries by unmanned aerial vehicles or drones. However, existing lockers are associated with some disadvantages. For example, package/parcel size of customer order is significantly restricted; capacity of a locker is fixed and not adjustable as desired; locker security is not sufficient; natural disaster tolerance is little considered for a locker; and/or a check-in feature that allows a locker to prepare in advance customer orders for quick pick-up is not integrated.

What is provided herein is a security system for an automated locker that stores and dispenses customer orders, which may overcome some aspects of disadvantages of an existing locker.

SUMMARY

Disclosed herein are security systems for an automated locker that stores and dispenses customer orders, which overcome at least some drawbacks known in the art. An example security system for an automated locker may include the automated locker including a plurality of sensors and a central computer in communication with the plurality sensors. The plurality sensors can include: at least one smoke detector configured to, via the central computer, sound an alarm and/or notify a fire station upon detecting smoke; at least one camera configured to take photos upon detecting a human being intrusion and/or notify police via the central computer; at least one sniffer configured to trigger, via the central computer, a lockdown of the automated locker upon detecting a hacking intrusion; at least one shock sensor configured to, via the central computer, sound a siren and/or turn on all lights inside the automated locker upon detecting a shock signal; at least one flood sensor configured to trigger, via the central computer, moving the central computer to an elevated level inside the automated locker; at least one wind sensor configured to trigger upon detecting wind greater than a prescribed threshold, via the central computer, to reprioritize the parcel arrangement inside to move heavy parcels to a lower-level portion of the automated locker, so as to reduce the risk of parcels falling and damaging the automated locker or other items as they fall; and at least one fire sensor configured to trigger upon detecting a fire, via the central computer, to reprioritize parcel arrangement to keep flammables, explosive, heat sensitive products as high and leeward to minimize the risk of damage to products and/or the automated locker. The security system may also include a remote server configured to receive sensitive data that is encrypted and/or erased from the central computer upon detecting a hack on the central computer.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

In this disclosure, security systems for an automated locker that receives, stores and/or dispenses customer orders, are provided. Lockers may be deployed in remote locations, inside retail stores, or outside of stores. Lockers may also be deployed in clusters, for example, to form a multiple-locker system in which lockers can be connected physically and electronically. The lockers can be operational during evenings, night, etc. As a result, the lockers may be vulnerable to vandalism or robbery. Additionally, the multitude of natural disasters or weather events may cause weather damage a consideration in design of the lockers. Accordingly, a locker can be configured to have a host of sensors which, upon detecting a specific event, direct the locker to take some action in response. The sensors may include cameras, smoke detectors, shock/vibration sensors, or sniffers.

The plurality of sensors may form a communication network in communications with a central computer in the locker. The central computer can be programmed to take specific actions, or direct corresponding structures/mechanisms to perform specific actions, when an event is detected.

For example, regarding shock/vibration sensors, when these sensors indicate an event is occurring, e.g. an attempt is made to pry a door of the locker, or vibration (cutting a panel of the locker) is detected, the locker may automatically move items/packages/parcels in the locker so that they are moved up as high as possible, with the most expensive product/item the highest.

In a multi-locker system or a system where the locker is connected to a store, a locker that is breached or detects an attempted breach is in progress may move product/items to a safer location (e.g., other non-breached lockers, or back to store stockroom) upon realizing a breach.

If a hack is detected, all sensitive data stored on the central computer of the locker may be encrypted, sent to central servers (e.g., cloud-based servers) to be backed up, and/or erased. Once this digital breach is detected, no dispersal of products/items may take place until it is confirmed that the situation is safe.

Figure 1:
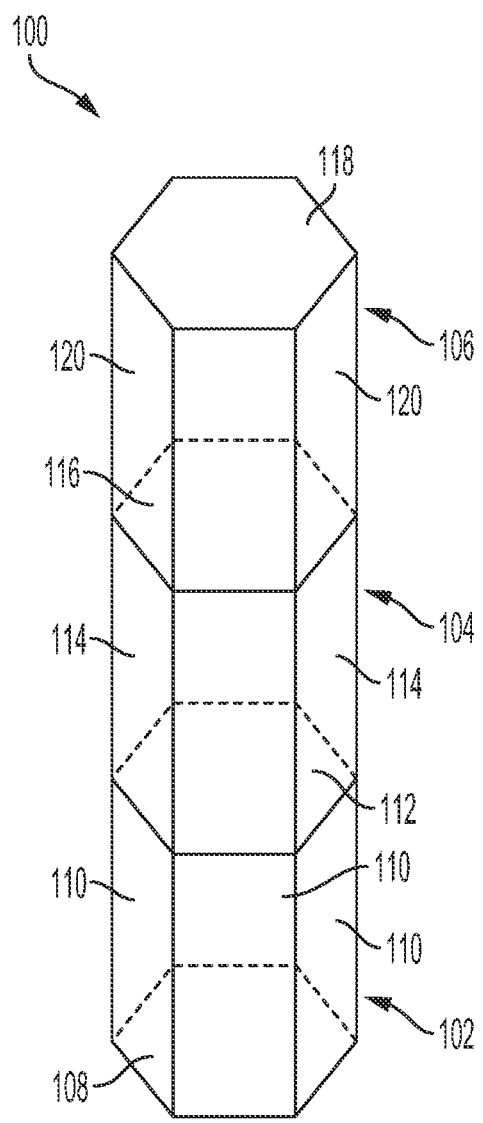
FIG. 1 illustrates a perspective view of an example—automated locker according to one example embodiment.

FIG. 1 illustrates an example locker 100 that may implement security systems disclosed herein. As shown in FIG. 1, the locker 100 may be a modular locker system for automated pickup of customer's parcels, and comprise a bottom modular section 102, at least one middle modular section 104, and a top modular section 106. The locker 100 may be installed in a remote location, or inside or outside a retail store. The bottom modular section 102, the at least one middle modular section 104, and the top modular section 106 can be vertically stacked on top of each other in a telescopic fashion. Such locker configuration may allow capacity of the modular locker 100 to be adjustable based on a local market, such that deployment of the modular locker system is more feasible in a remote location, or a high volume location. Such locker configuration may also allow for peak use and less climate control during off-peak use.

The bottom modular section 102 may be established at a ground level and may be configured to have infrastructure for mounting to a foundation. The bottom modular section 102 may further be configured to have a side circumferential vertical enclosure and a bottom horizontal surface 108 connecting to the side circumferential vertical enclosure. The side circumferential vertical enclosure may have a cross-section of any polygon, and may comprise a plurality of panels 110 corresponding to the sides of the polygonal cross-section. The bottom modular section 102 may also include one or more pickup/dispensing windows on the panels 110. The bottom modular section 102 may further include a crane car and a crane associated with the crane car, a central computer and associated computer networking components, and a power unit.

In some embodiments, the bottom modular section 102 may be made of sturdier materials in order to support the at least one middle modular section 104 and the top modular section 106, as well as to provide protection against accidental ground level damages.

Figure 2:
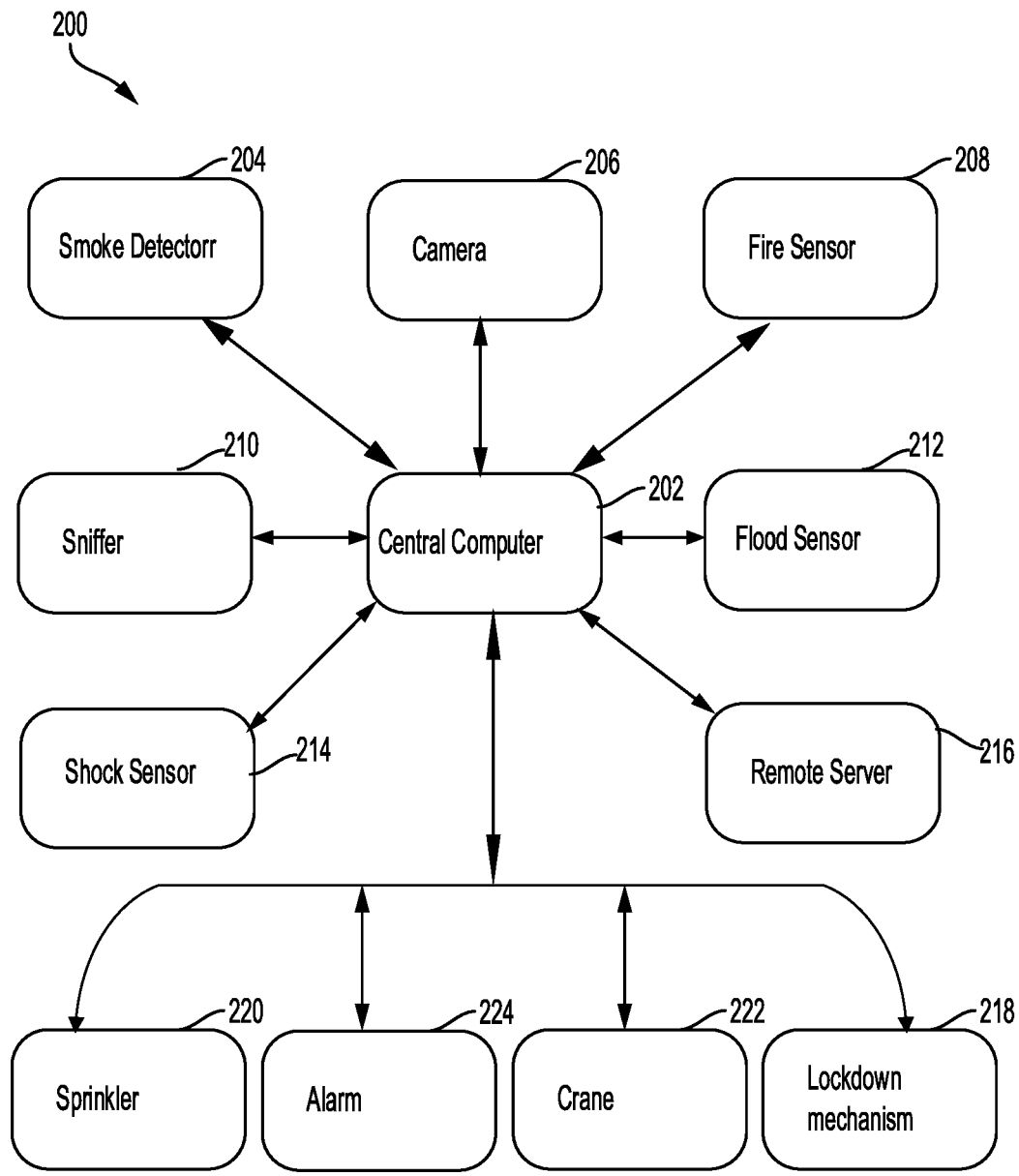
FIG. 2 illustrates an example logic of a security system that may be applied to the locker of FIG. 1 according to an example embodiment.

Security systems disclosed herein may be applied to the above locker systems. The security systems can also be used for a locker system having a single modular section, for example, a locker system having only the bottom modular section 102. Further, the security systems may also be used for a locker system comprising a plurality of modular sections that are configured to be attached to one another horizontally, instead of being stacked vertically like the locker system 100 of FIG. 1. FIG. 2 illustrates an example logic of a security system 200 that may be applied to the locker of FIG. 1 according to an example embodiment.

As shown in FIG. 2, the security system 200 may comprise a central computer 202 and the plurality of sensors of different types in communication with the central computer 202. The security system 200 may also comprise a remote server 216 in communication with the central computer 202. The plurality sensors may include, but not limited to, at least one smoke detector 204, at least one camera 206, at least one fire sensor 208, at least one sniffer 210, at least one flood sensor 212, and/or at least one shock sensor 214. The sensors may be installed internally or externally on the locker system, for example, on a ceiling/floor surface of a modular section or on an inside surface of panels.

Upon detecting one or more events, each of the sensors or a combination of the sensor may be triggered, via the central computer 202, to perform through corresponding mechanisms/structures one or more of the following: locking down the locker system via the lockdown mechanism 218, turning on a sprinkler system 220 inside the locker, rearranging the customers parcels via crane 222 such that parcels at lower levels are moved up as high as possible, with the most expensive parcels the highest, opening some panels of a lower section of the automated locker to allow for dry air to pass through the automated locker and/or water to pass through and pass out of the automated locker, operating shutters to allow as great a portion of wind to pass through the automated locker to minimize the wind pressure on the automated locker, stopping dispensing of the parcels/packages/items, encrypting all sensitive data stored on the central computer 202, sending the sensitive data to the remote servers 216 (e.g., cloud-based servers), and/or erasing the sensitive data from the central computer 202, or activate an alarm 224 to call police and/or a fire engine. After the events are cleared, the central computer may configure the sensors to perform reverse actions. For example, the sensitive data may be written back to the central computer 202 from the remote server 216.

In some embodiments, each of the sensors may be configured to trigger a specific mechanism/structure to perform a specific action. Some examples may be as follows.

The at least one smoke detector 204 may be configured to, via the central computer 202, sound an alarm and/or notify a fire station upon detecting smoke.

The at least one camera 206 may be configured to take photos upon detecting a human being intrusion and/or notify police via the central computer. The at least one camera 206 may further be configured to trigger a speaker to announce, for example, "you are under surveillance, and the police are being called."

The at least one fire sensor 208 may be configured to trigger upon detecting a fire, via the central computer, to reprioritize parcel arrangement to keep flammables, explosive, heat sensitive products as high and leeward to minimize the risk of damage to products and/or the automated locker. Also, the packages/parcels/items may be moved from one location inside the locker that is warm/hot due to the fire, to another location inside the locker that is cool. The fire may be originated from inside or outside of the locker.

The at least one sniffer 210 may be configured to trigger, via the central computer, a lockdown of the automated locker upon detecting a chemical substance. For example, ozone may be detected when an electric fire occurs.

The at least one flood sensor 212 may be configured to trigger, via the central computer, move the central computer to an elevated level inside the automated locker. The at least one flood sensor 212 may also be configured to, via the central computer, open some panels of a lower section (e.g., a bottom modular section) of the automated locker to allow for dry air to pass through the automated locker and/or water to pass through and pass out of the automated locker.

The least one shock sensor 214 may be configured to, via the central computer, sound a siren and/or turn on all lights inside the automated locker upon detecting a shock signal. The shock signal may be generated from physical hack/unusual activities to the locker. For example, a door of the locker may be pried open; someone is drilling through the locker; someone is brutally breaking into the locker (e.g., heavy shutting of the door); or someone is cutting a hole/a portion on the locker. The shock sensor 214 may further be configured to lock down the locker via internal shutters or shut down the crane of the locker. The shock sensor 214 may also be configured to trigger rearranging the customers' parcels such that parcels at lower levels are moved up as high as possible with the most expensive parcels the highest.

The security system may also comprise at least one wind sensor. The at least one wind sensor may be configured to trigger, upon detecting wind greater than a prescribed threshold, via the central computer, to reprioritize the parcel arrangement inside to move heavy parcels to a lower-level portion of the automated locker, so as to reduce the risk of parcels falling and damaging the automated locker or other items as they fall. The at least on wind sensor may also be configured to trigger corresponding mechanism/structure to open windows to allow wind through the locker, such that impact on the locker by the wind may be reduced. The at least one wind sensor may be further configured to, via the central computer, trigger openable shutters to allow as great a portion of wind to pass through the automated locker to minimize the wind pressure on the automated locker.

The central computer may further comprises a digital intrusion detection program. The digital intrusion detection program can be configured, upon detecting a digital intrusion (e.g., hacking), to perform one or more of the following: encrypting all sensitive data stored on the central computer, sending the sensitive data to the remote servers, or erasing the sensitive data from the central computer. The automated locker may be configured to stop dispensing of the parcels once the hack on the central computer is detected.

The remote server 216 may be configured to receive sensitive data that is encrypted and/or erased from the central computer upon detecting a hack on the central computer.

In some embodiments, the security system 200 may incorporate weather reports. With the weather reports, the security system 200 may automatically prepare and trigger corresponding mechanisms to perform certain actions based on the weather reports. For example, if rain is expected in a few hours, the security system 200 may have the locker move some items further to the center of the locker.

In some embodiments, an action to be performed by the locker may be based on a combination of factors/parameters determined by the security system 200. For example, moving items from a higher level to a lower level may be based on a wind strength (e.g., greater than 50 mile per hour) determined the wind sensor and a flood strength (e.g., no flood) determined by the flood sensor.

In some embodiments, actions/tasks triggered by the security system 200 may be categorized as different levels. For example, the locker system may have a flood protection feature of an inflatable skirt (e.g., four feet tall) around the bottom of the locker. When the weather report forecasts that there will have nine inches of rain in twenty-four hours or at least ninety-nine percent chance the rain happening. The security system 200 may just issue an alert, which may be referred to as a level one action. When sensors detect that it is raining hard and there is some water coming up to the locker, the security system 200 may issue a notice informing the locker to get prepared for potential flood, but is not triggered to activate the inflatable skirt because customers may not be able to take items out when the skirt is activated. This may referred to as a level two action. When water is detected inside the locker (e.g., by a moisture sensor), the skirt is activated, and then items may be moved as high as they can go inside the locker, which may referred to as a level three action. The level three action may also comprise delinking from power supply because an electrical storm or something like may be associated with the flood. As such, the locker system can be considered as a self-contained unit that keeps not only the products/items safe, but also itself safe. Further, when the locker inside gets wet, air can be allowed to get into the locker to facilitate drying out.

Figure 3:
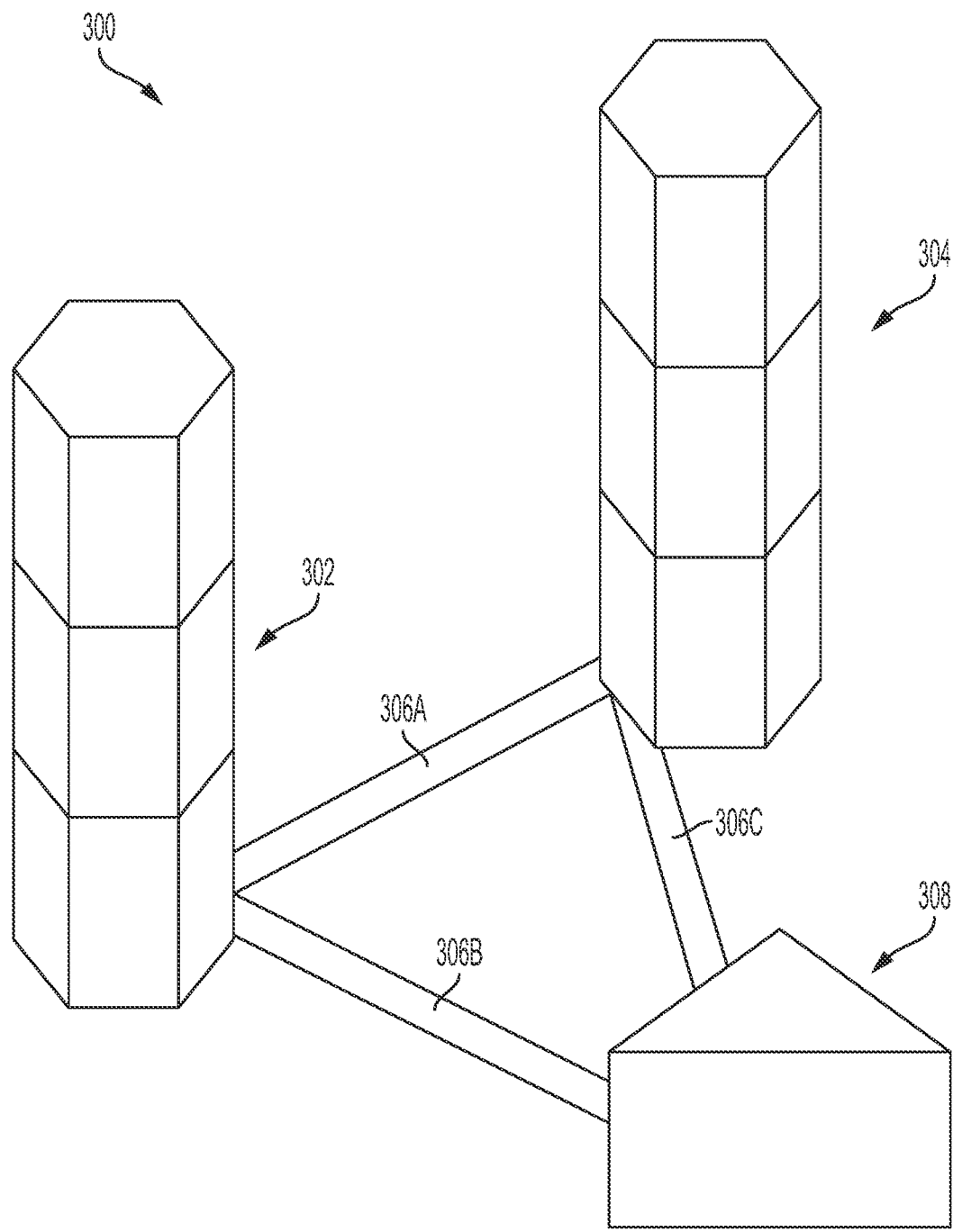
FIG. 3 illustrates an example multi-locker system that may implement the security system of FIG. 2 according to one embodiment.

In some embodiments, a multi-locker or store system may be provided. FIG. 3 illustrates an example multi-locker/store system 300 that may implement the security system of FIG. 2 according to one embodiment. The system 300 may comprise a first automated locker 302, a second automated locker 304, and/or a store 308. The first automated locker 302, the second automated locker 304, and the store 308 may be physically and structurally connected each other, for example, via connections 306A-C. The connection 306 may be an enclosed conveyor.

The first automated locker 302, when breached, may be configured to, via the central computer, transfer the parcels/packages from the first automated locker 302 to the second automated locker 304 through the enclosed conveyor 306 when at least one of the plurality of sensors inside the locker 302 is triggered, wherein the second automated locker 304 is not breached.

The first automated locker 302 or the second automated locker 304, when breached, may be configured to, via the central computer, transfer the parcels/packages from the automated lockers 302/304 to the store through the enclosed conveyor 306 when at least one of the plurality of sensors is triggered.

In some embodiments, the connection 306 may comprise a track. The first automated locker 302 or the second automated locker 304, when breached, may be configured to, move on the track to inside the store and are protected by the store.

In some embodiments, the first automated locker 302 and the second automated locker 304 may further comprise an underground facility. The first automated locker 302 or the second automated locker 304, when breached, may be configured to automatically withdraw into the underground facility.

Figure 4:
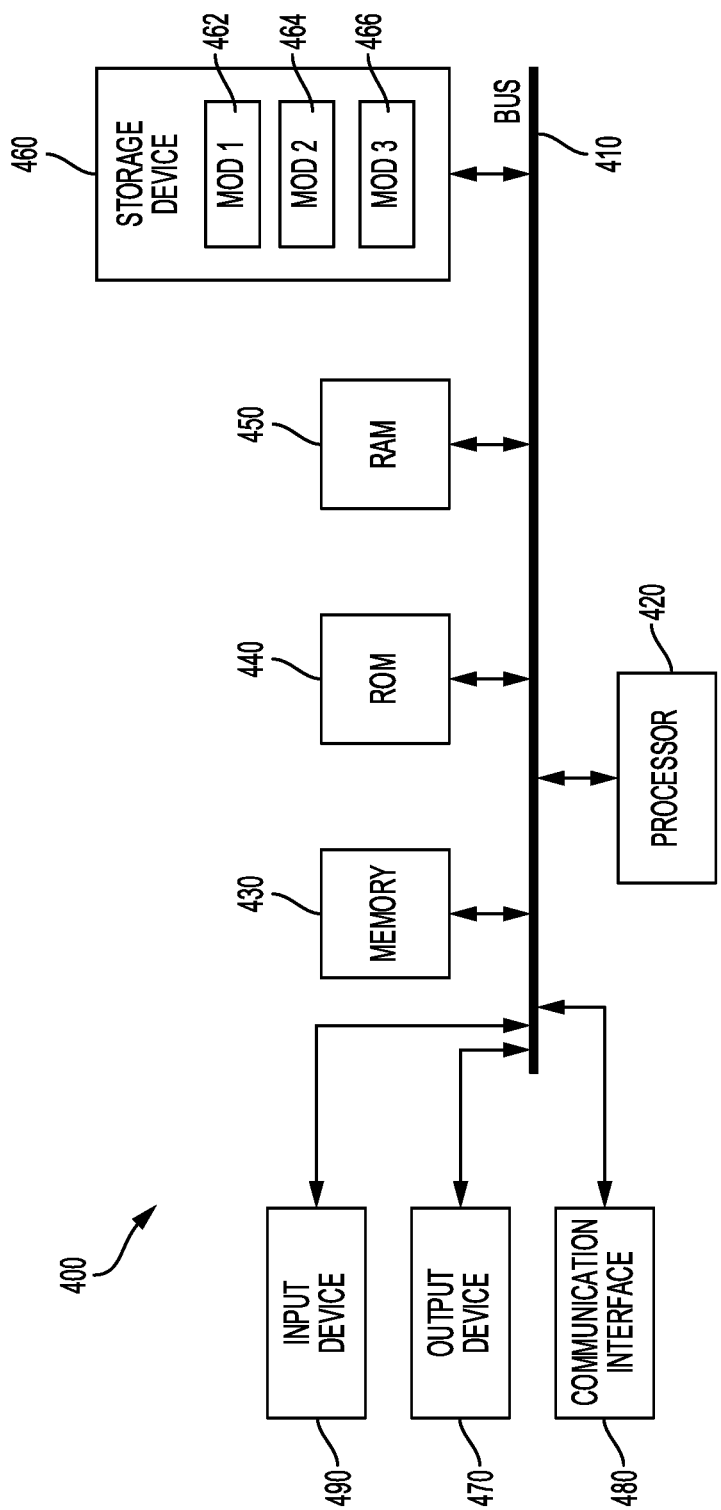
FIG. 4 illustrates an example computer system which can be used to implement the systems and methods to one example embodiment.

FIG. 4 illustrates an example computer system 400 which can be used to perform the systems for inventory monitoring as disclosed herein. The exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An automated locker for storing and dispensing items, comprising:
    a plurality of sensors;
    a central computer in communication with the plurality sensors, wherein:
        the plurality of sensors includes:
            a smoke detector configured to, via the central computer, issue a notification upon detecting smoke;
            a camera configured to take photos upon detecting an intrusion into the locker and/or issue an intrusion notification via the central computer;
            a sniffer configured to trigger, via the central computer, a lockdown of the automated locker upon detecting a hazardous substance;
            a vibration sensor configured to sense vibrations at the locker and to, via the central computer, sound an alarm and/or illuminate lights at the locker upon detecting a vibration indicating an attempt to enter the locker;
            a flood sensor configured to sense water at a base of the locker and to trigger, via the central computer, an actuator to move the central computer and items within the locker to an elevated level inside the locker;
            a wind sensor configured to trigger upon detecting wind greater than a prescribed threshold, the central computer issuing instruction to reprioritize the parcel arrangement inside to move heavy parcels to a lower-level portion of the automated locker; and
            a fire sensor configured to trigger upon detecting a fire, the central computer configured to issue instructions to reprioritize parcel arrangement to keep flammables, explosive, heat sensitive products as high and leeward to minimize the risk of damage to products and/or the automated locker, and
            an electronic intrusions sensor configured to detect an unauthorized attempt to access the central computer and to at least one of encrypt data on the central computer, send data from the central computer to a remote server, and erase data from the central computer upon detecting the unauthorized access attempt.

2. The locker of claim 1, wherein the automated locker is deployed inside or outside a retail store.

3. The locker of claim 1, wherein the automated locker is a single modular locker.

4. The locker of claim 1, wherein the automated locker comprises a bottom modular section mounted at a ground level, at least one middle modular section vertically affixed atop the bottom modular section, and a top modular section vertically affixed atop the at least one middle modular section.

5. The locker of claim 1, wherein the automated locker comprises a plurality of wedge-shaped slices horizontally assembled together.

6. The locker of claim 1, wherein the at least one smoke detector is further configured to trigger a sprinkler system inside the automated locker.

7. The locker of claim 1, wherein the vibration sensor is configured to detect a vibration from one of: cutting a portion of the automated locker, prying a door of the automated locker, or heavy shutting of the door.

8. The locker of claim 1, wherein the central computer is further configured to issue instructions for rearranging the customers parcels such that parcels at lower levels are moved up as high as possible, with the most expensive parcels the highest.

9. The locker of claim 1, wherein the central computer is configured to issue instructions to open panels of a lower section of the automated locker to allow for air to pass through the automated locker and/or water to pass through and pass out of the automated locker.

10. The locker of claim 1, further comprising shutters and wherein the central computer issue instructions to open the shutters to allow air to pass through the automated locker to minimize the wind pressure on the automated locker.

11. The locker of claim 1, wherein in the remote server is a cloud-based server.

12. The locker of claim 1, wherein the automated locker is configured to stop dispensing of the items once the attempted intrusion is detected.

13. The locker of claim 1, wherein the automated locker is a first automated locker, and further comprises a second automated locker that is configured to connect to the first automated locker.

14. The locker of claim 13, wherein the connection between the first automated locker and the second automated locker includes an enclosed conveyor.

15. The locker of claim 14, wherein the first automated locker is configured to, via the central computer, transfer the parcels from the first automated locker to the second automated locker through the enclosed conveyor when at least one of the plurality of sensors is triggered, wherein the second automated locker is not breached.

16. The locker of claim 1, further comprising a store that is configured to connect to the automated locker.

17. The locker claim 16, wherein the connection between the automated locker and the store includes an enclosed conveyor.

18. The locker of claim 17, wherein the automated locker is configured to, via the central computer, transfer the parcels from the automated locker to the store through the enclosed conveyor when at least one of the plurality of sensors is triggered.

19. The system of claim 1, wherein the central computer comprises a digital intrusion detection program, and the digital intrusion detection program is configured, upon detecting a digital intrusion, to perform one or more of the following: encrypting all sensitive data stored on the central computer, sending the sensitive data to the remote servers, or erasing the sensitive data from the central computer.

* * * * *